United States Patent
Mao et al.

(10) Patent No.: US 8,892,584 B1
(45) Date of Patent: Nov. 18, 2014

(54) SYSTEMS AND METHODS FOR IDENTIFYING NEW WORDS FROM A META TAG

(75) Inventors: Jun Mao, Beijing (CN); Jingnan Si, Beijing (CN); Xue Feng Tian, Beijing (CN)

(73) Assignee: Symantec Corporation, Mountain View, CA (US)

( * ) Notice: Subject to any disclaimer, the term of this patent is extended or adjusted under 35 U.S.C. 154(b) by 190 days.

(21) Appl. No.: 13/073,694

(22) Filed: Mar. 28, 2011

(51) Int. Cl.
*G06F 17/30* (2006.01)
*G06F 17/27* (2006.01)

(52) U.S. Cl.
USPC ............................................ 707/758; 704/10

(58) Field of Classification Search
CPC ............ G06F 17/30864; G06F 17/241; G06F 17/30634; G06F 17/2735; G06F 17/30569; G06F 17/2276; G06F 17/2795; G06F 17/2872; G06F 17/30967; G06F 17/3089; G06F 17/40; G06F 17/2863
USPC .................................. 707/705–780; 704/1–10
See application file for complete search history.

(56) References Cited

U.S. PATENT DOCUMENTS

| | | | |
|---|---|---|---|
| 6,671,856 B1 * | 12/2003 | Gillam | 715/210 |
| 7,155,672 B1 * | 12/2006 | Adler et al. | 715/210 |
| 7,447,684 B2 * | 11/2008 | Bates | 1/1 |
| 7,464,078 B2 * | 12/2008 | Dill et al. | 1/1 |
| 8,010,344 B2 * | 8/2011 | Zhang | 704/10 |
| 8,539,349 B1 * | 9/2013 | Kirshenbaum | 715/264 |
| 2002/0194166 A1 * | 12/2002 | Fowler | 707/3 |
| 2003/0005159 A1 * | 1/2003 | Kumhyr | 709/246 |
| 2004/0102201 A1 * | 5/2004 | Levin | 455/466 |
| 2011/0066624 A1 * | 3/2011 | Turakhia | 707/748 |
| 2011/0137943 A1 * | 6/2011 | Asano | 707/780 |

\* cited by examiner

*Primary Examiner* — Michelle Owyang
(74) *Attorney, Agent, or Firm* — Holland & Hart LLP

(57) ABSTRACT

A computer-implemented method to identify new words from a meta tag is described. A Hyper-Text Markup Language (HTML) page is analyzed to identify a meta tag associated with the HTML page. At least one separator included in content of the meta tag is identified. The content of the meta tag is divided using the identified separator. A portion of the divided content is compared to content stored in a database. Upon determining that the portion of the divided content does not exist in the database, the portion of the divided content is added to the database.

10 Claims, 7 Drawing Sheets

SYSTEMS AND METHODS FOR IDENTIFYING NEW WORDS FROM A META TAG

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

Computer networks, such as the Internet, continue to provide a vast amount of information to users of computers. Information on the Internet may be available in almost any language. Words in these various languages may be stored in a database for future reference. As languages evolve, new words may appear for a particular language. The format of some languages, however, may increase the difficulty to identify individual words. As a result, new words for these languages may not be readily identifiable. As such, benefits may be realized by providing improved systems and methods for identifying new words in various languages. In particular, benefits may be realized by identifying new words by using a meta tag linked to the information on the Internet.

SUMMARY

According to at least one embodiment, a computer-implemented method to identify new words from a meta tag is described. A Hyper-Text Markup Language (HTML) page is analyzed to identify a meta tag associated with the HTML page. At least one separator included in content of the meta tag is identified. The content of the meta tag is divided using the identified separator. A portion of the divided content is compared to content stored in a database. Upon determining that the portion of the divided content does not exist in the database, the portion of the divided content is added to the database.

In one embodiment, the meta tag may be a meta keyword tag. In one example, the content of the meta tag may include at least one keyword related to the content of the HTML page. In one embodiment, the content of the meta tag may be written in a non Latin-based language. In another embodiment, the content of the meta tag may be written in a Latin-based language.

In one configuration, the divided content of the meta tag may be filtered according to predetermined criteria. The at least one separator may be a comma. The at least one separator may also be a semi-colon. Further, the at least one separator may be a space. The at least one separator may separates at least one word from another word that are included as the content of the meta tag.

A computing device configured to identify new words from a meta tag is also described. The computing device may include a processor and memory in electronic communication with the processor. The computing device may also include a word discovery module configured to analyze a Hyper-Text Markup Language (HTML) page to identify a meta tag associated with the HTML page. The word discovery module may also be configured to identify at least one separator included in content of the meta tag, and divide the content of the meta tag using the identified separator. The word discovery module may be further configured to compare a portion of the divided content to content stored in a database. Upon determining that the portion of the divided content does not exist in the database, the word discovery module may be configured to add the portion of the divided content to the database.

A computer-program product for identifying new words from a meta tag is also described. The computer-program product may include a non-transitory computer-readable medium having instructions thereon. The instructions may include code programmed to analyze a Hyper-Text Markup Language (HTML) page to identify a meta tag associated with the HTML page. The instructions may also include code programmed to identify at least one separator included in content of the meta tag, and code programmed to divide the content of the meta tag using the identified separator. The instructions may further include code programmed to compare a portion of the divided content to content stored in a database. Upon determining that the portion of the divided content does not exist in the database, the instructions may include code programmed to add the portion of the divided content to the database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
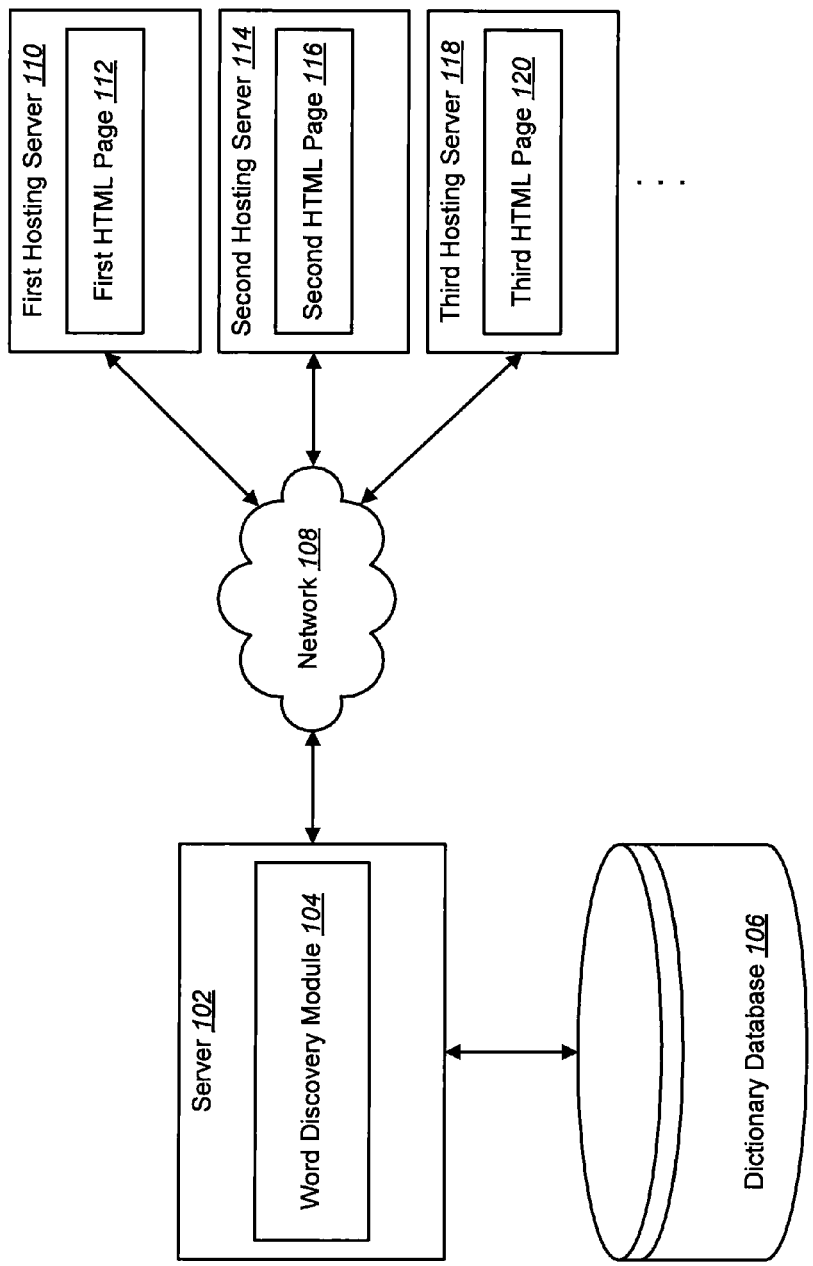
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The development of web pages created using the HyperText Markup Language (HTML) continues to increase at a fast pace. HTML pages may include graphics, multi-media, text, and the like. In one embodiment, the language of the text included on an HTML page may be in any language (e.g., English, Chinese, Arabic, Italian, Spanish, Latin, etc.). With any language, new words may appear for that language. These new words may include names of individuals, slang terms, object names, and the like. In one example, a dictionary (in the form of a database) may be populated with words of a certain language by using a web crawler to crawl the content of a HTML page that includes text in that particular language. As words are discovered on the web site that are not yet included in the dictionary, they may be added to the dictionary.

A problem, however, may arise when the web crawler is unable to decipher individual words from the text on the HTML page. For example, some languages (e.g., non-Latin languages such as East Asian languages) do not include a delimiter between words. As a result, traditional methods of crawling HTML pages to discover new words may not be efficient because the web crawler may not be able to identify individual words on the HTML page for certain languages due to a lack of separation between the words.

In one configuration, the present systems and methods may discover new words (i.e., words not yet included in a dictionary database for a particular language) based on meta tags included on an HTML page. Meta tags may provide information about a given HTML page, most often to help search engines categorize the HTML page correctly. In one embodiment, the meta tags may be inserted into the coding of the HTML page, but are often not directly visible to a user accessing the page.

In one embodiment, the content of meta tags may be given relatively high weight by a search engine when the search engine is categorizing the HTML page. As a result, administrators, editors, creators, etc. of HTML pages may be motivated to optimize the content included in the meta tags. In other words, an editor of an HTML page may be motivated to include content (e.g., words, sentences, etc.) in meta tags of the page that are related to the words a user may input to query a search engine for HTML pages that include those words. For example, if an HTML page includes content relating to "trees", the editor of the page may include words in the meta tags such as, but not limited to, "leaves, bark, forest, and branches." As a result, the meta tags of this HTML page may include words that a user (who is searching for HTML pages that include content relating to "trees") may input as a query to a search engine. The present systems and methods may analyze the content of meta tags to discover new words in a particular language.

FIG. 1 is a block diagram illustrating one embodiment of an environment in which the present systems and methods may be implemented. In one configuration, a server 102 may communicate with hosting servers 110, 114, 118 across a network connection 108. The hosting servers 110, 114, 118 may host at least one HTML page 112, 116, 120. Each HTML page 112, 116, 120 may include content that is in a different language. For example, a first HTML page 112 may include content in the Chinese language, a second HTML page 116 may include content in the Japanese language, and a third HTML page 120 may include content in the Arabic language.

In one configuration, the server 104 may include a word discovery module 104. The word discovery module 104 may discover words in any language that have not yet been added to a dictionary database 106. The database 106 may include lists of words in various languages. For example, the database 106 may include a list of words in the Chinese language, Japanese language, the Arabic language, and the like. The word discovery module 104 may analyze content on a HTML page 112, 116, 120 to identify individual words related to the content of the page 112, 116, 120. Details regarding the word discovery module 104 and the content of an HTML page 112, 116, 120 that is analyzed will be described below.

Figure 2:
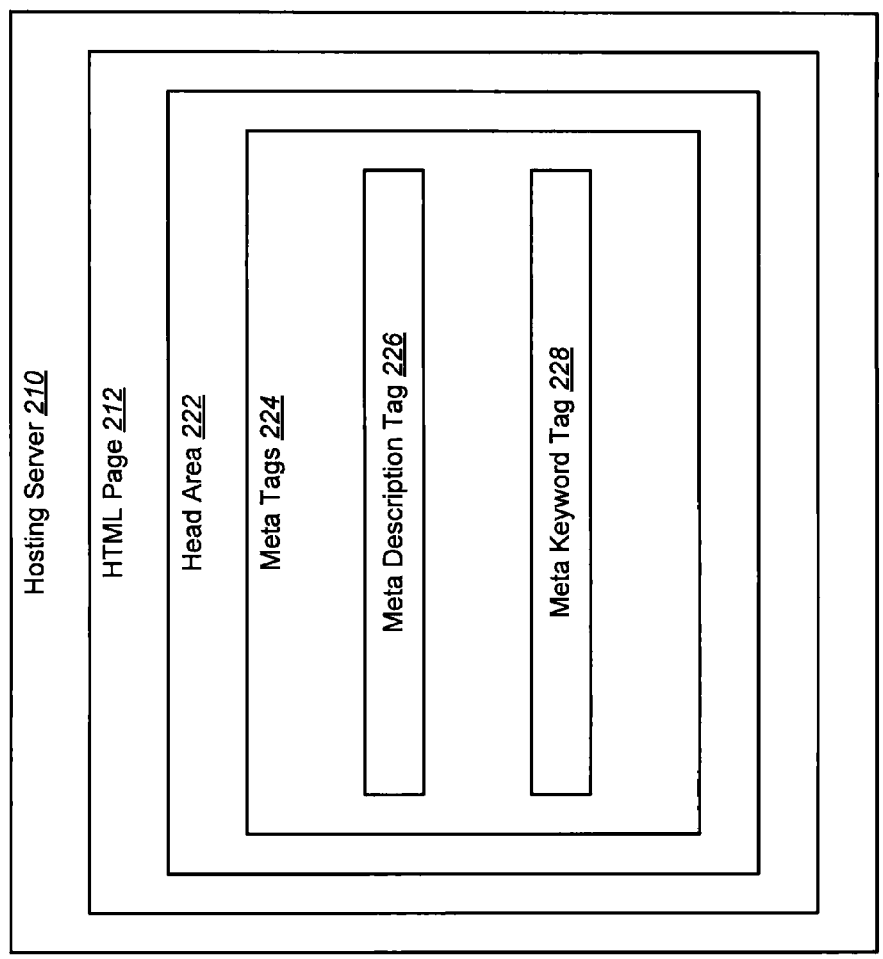
FIG. 2 is a block diagram illustrating one embodiment of a hosting server that may host an HTML page.

FIG. 2 is a block diagram illustrating one embodiment of a hosting server 210 that may host an HTML page 212. The content of the HTML page 212 may be in any language. In one configuration, the HTML page 212 may include a head area 222. The head area 222 may include one or more meta tags 224. Examples of meta tags 224 included in the head area 222 may include a meta description tag 226 and a meta keyword tag 238.

In one example, the meta description tag 226 may allow an administrator, editor, creator, etc. of the HTML page 212 to influence the description of the page 212 in web crawlers. In other words, the content included in the meta description tag 226 may be the content displayed in a listing provided by a search engine to describe the HTML page 212. In one configuration, the meta keyword tag 238 may include a list of keywords and keyword phrases that the administrator, editor, creator etc. has targeted for the HTML page 212. In other words, the meta keyword tag 238 may be a brief and concise list of the themes of the HTML page 212. As explained above, non-Latin languages (e.g., East Asian languages) may not include a space between words. Words, however, included in the meta keyword tag 238 may include some sort of delimiter between individual words. For example, the following is an example of source code for a meta keyword tag 238 in the Chinese language:

<meta name=keywords content="北京,试点, 公积金, 贷款支持, 保障房, 公积金, 保障">

As shown by the example above, each character (representing a keyword) in the meta keyword tag 238 is separated by a comma. The present systems and methods may analyze the meta keyword tag 238 to identify individual words included in the tag 238 regardless of the language.

Figure 3:
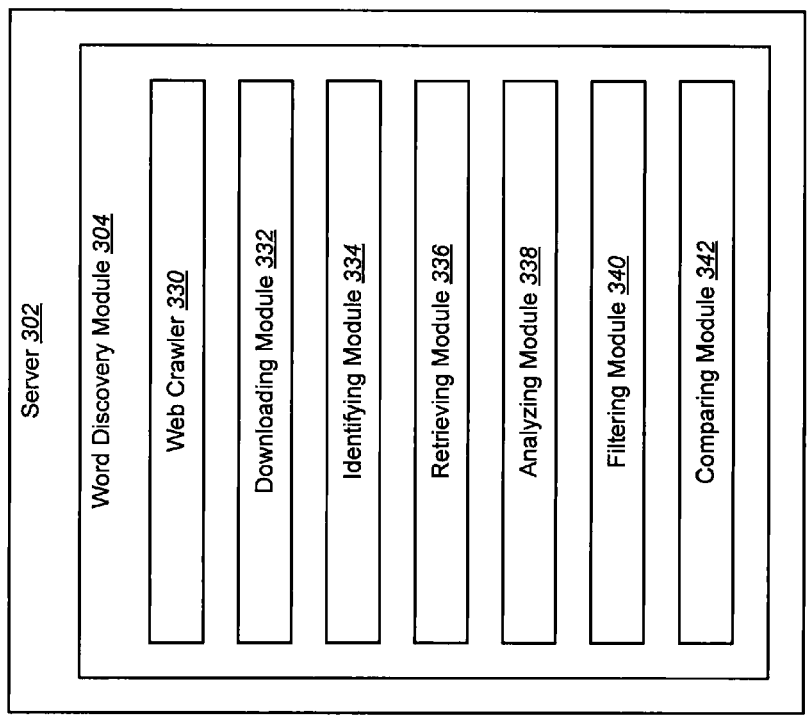
FIG. 3 is a block diagram illustrating one embodiment of a server that includes a word discovery module in accordance with the present systems and methods.

FIG. 3 is a block diagram illustrating one embodiment of a server 302 that includes a word discovery module 304 in accordance with the present systems and methods. In one configuration, the word discovery module 304 may include a web crawler 330, a downloading module 332, an identifying module 334, a retrieving module 336, an analyzing module 338, a filtering module 340, and a comparing module 342.

In one example, the web crawler 330 may crawl the web to locate HTML pages (e.g., web pages). The downloading module 332 may download a page discovered by the web crawler 330. The HTML page 112 may be downloaded to the server 302 for further analysis. In one embodiment, the identifying module 334 may identify the meta tags of the downloaded HTML page 112. For example, the identifying module 334 may identify the meta keyword tag 238 of the downloaded HTML page 112. In one configuration, the retrieving module 336 may retrieve the identified meta tags. In particular, the module 336 may retrieve the meta keyword tag 238 from the downloaded HTML page 112. In one example, the retrieval module 336 may copy the meta keyword tag 336 for further analysis.

In one embodiment, the analyzing module 338 may analyze the retrieved meta keyword tag 238. The module 338 may analyze the tag 238 to identify individual words included in the tag 238. The analyzing module 338 may analyze the tag 238 to discover delimiters or other special characters (e.g., comma, semi-colon, period, etc.) that may separate words included in the meta keyword tag 238. The filtering module 340 may filter the identified words according to pre-determined criteria. For example, the filtering module 340 may filter identified words based on their location in the meta keyword tag 238. In one embodiment, the comparing module 342 may compare the words filtered by the filtering module 340 to words included in a dictionary database 106. If a word in the meta keyword tag 238 is not included in the database 106, the word discovery module 304 may add that word to the dictionary database 106.

Figure 4:
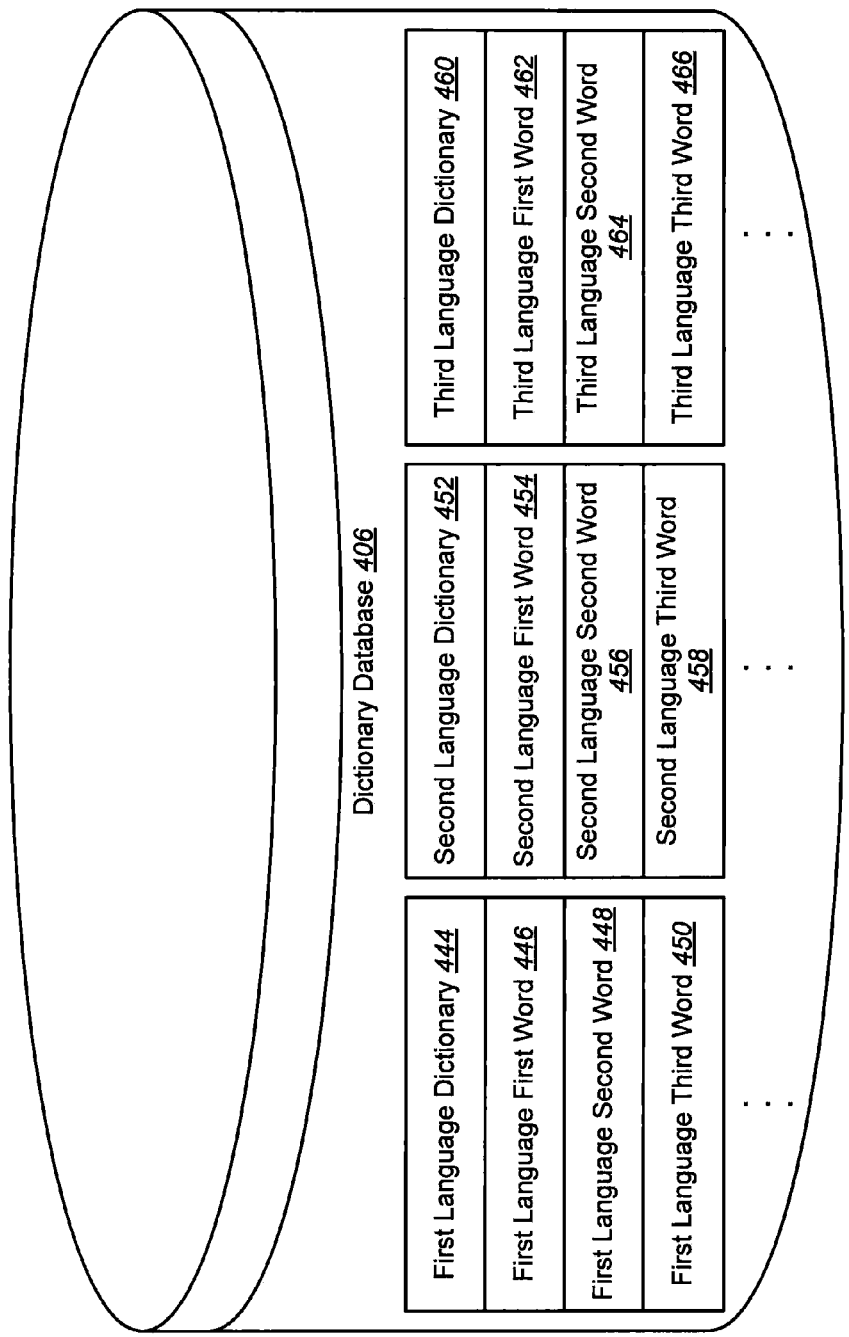
FIG. 4 is a block diagram illustrating one embodiment of a dictionary database in accordance with the present systems and methods.

FIG. 4 is a block diagram illustrating one embodiment of a dictionary database 406 in accordance with the present systems and methods. The database 406 may include one or more dictionaries 444, 452, 460 of different languages. For example, a first language dictionary 444 may be for the Chinese language. The first language dictionary 444 may include a list of words 446, 448, 450. The words may be in the first language. Similarly, a second language dictionary 452 may include a list of words 454, 456, 458 in the second language. Further, a third language dictionary 460 may include a list of words 462, 464, 466 in the third language. In one configuration, as the word discovery module 104 identifies words in the first language included in the meta keyword tag 238, word discovery module 104 may add words to the first language dictionary 444 if they are not already present in the dictionary 444. The word discovery module 104 may also perform these functions for words in the second language, the third language, and the like.

Figure 5:
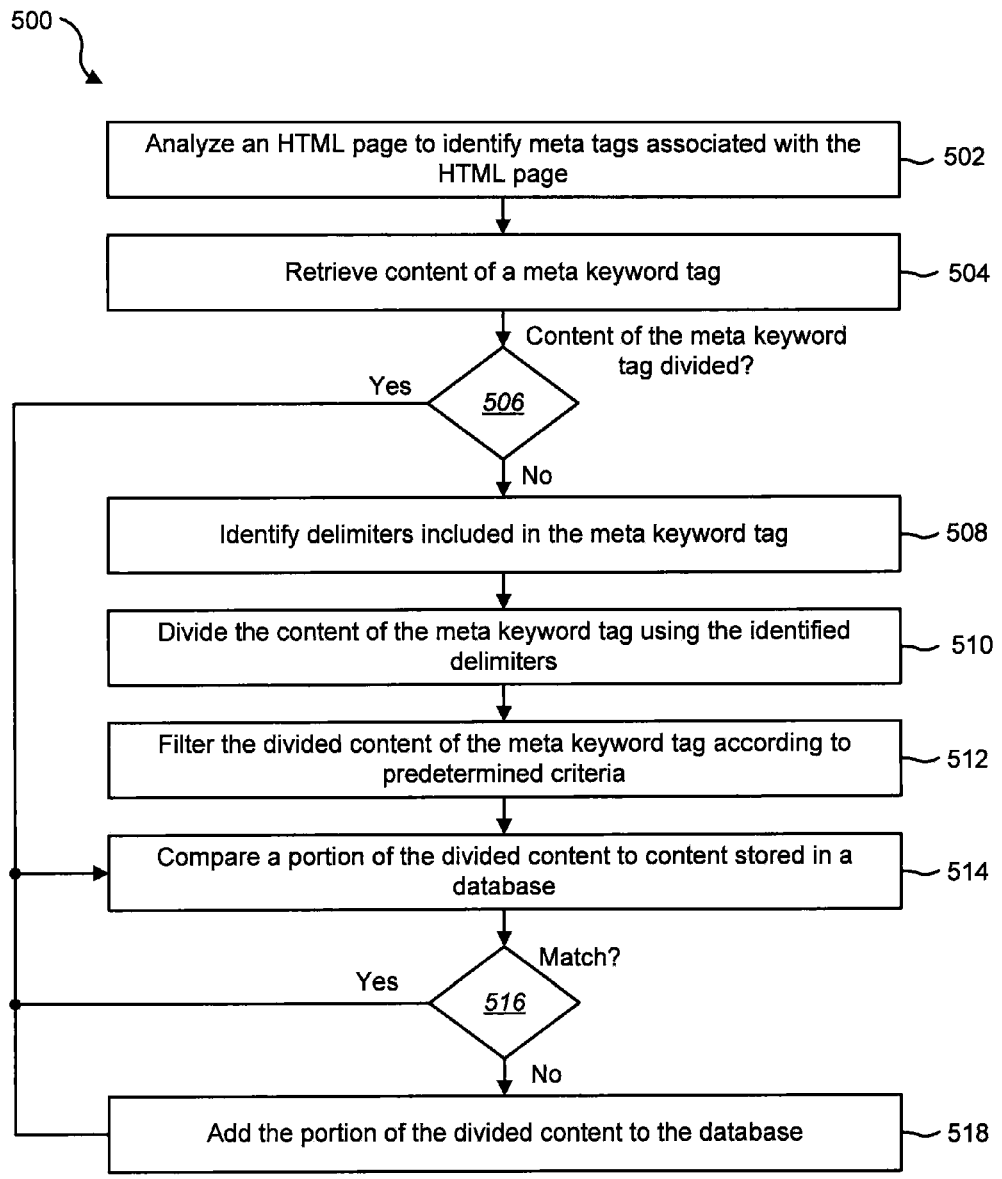
FIG. 5 is a flow diagram illustrating one embodiment of a method to identify words from meta tags.

FIG. 5 is a flow diagram illustrating one embodiment of a method 500 to identify words from meta tags. In one configuration, the method 500 may be implemented by the word discovery module 104.

In one example, an HTML page may be analyzed 502 to identify meta tags associated with the HTML page. In one embodiment, the content of a meta keyword tag may be retrieved 504. A determination 506 may be made as to whether the content of the meta keyword tag is divided. For example, a determination 506 may be made as to whether a space exists between words included in the meta keyword tag. If it is determined 506 that the content of the meta keyword tag is divided, a portion of the divided content may be compared 514 to content stored in a database. The portion of the divided content that may be compared 514 to content in the database may be word.

If, however, it is determined that content of the meta keyword tag is not divided, delimiters included in the meta keyword tag may be identified 508. The content of the meta keyword tag may be divided 510 using the identified delimiters. In one example, the delimiters may be special characters such as, but not limited to, commas, periods, semi-colons, and the like. In one example, the divided content of the meta keyword tag may be filtered 512 according to predetermined criteria.

The method 500 may then continue to compare 514 a portion of the divided content to content stored in a database, as previously described. A determination 516 may be made as to whether the portion of the divided content matches content stored in the database. If it is determined 516 that the portion of the divided content matches content in the database, the method 500 may return to compare another portion of the divided content with the content of the database until each portion of the divided content is compared with the database. If, however, it is determined 516 that the portion of the divided content does not match the content of the database (e.g., discovery of a new word), the portion of the divided content may be added 518 to the database. The method 500 may then return to compare an additional portion of the divided content with the content of the database, as previously described.

In one embodiment, keywords included in a meta keyword tag 238 have much fewer error words because the keywords are edited by administrators, editors, creators, etc. of HTML pages. As explained above, these words in the meta keyword tag 238 may represent a trend of new words for a particular language. For example, if a new event is going to occur (new words usually appear with the occurrence of a new event), editors of HTML pages relating to the new event may post an article as an HTML page and insert the new words in the meta keyword tag 238 as keywords of that HTML page. As a result, new words for any language may be identified by the delimiters that are used to separate the words in the meta keyword tag 238. If the identified words are not already included in a dictionary database 106, the new words may be added to the database 106.

Figure 6:
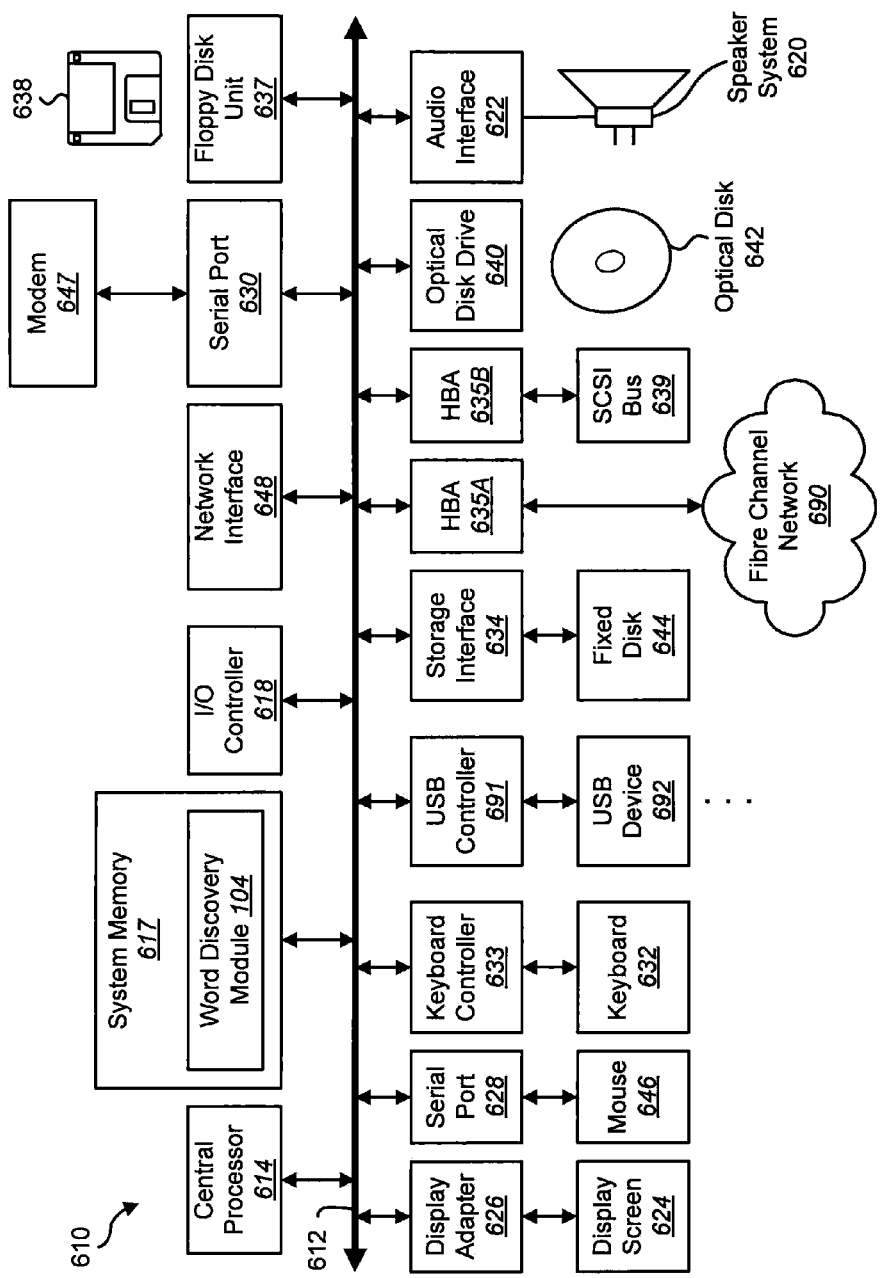
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 691), a storage interface 634, a floppy disk unit 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 846 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the sequence recognizing module 104 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
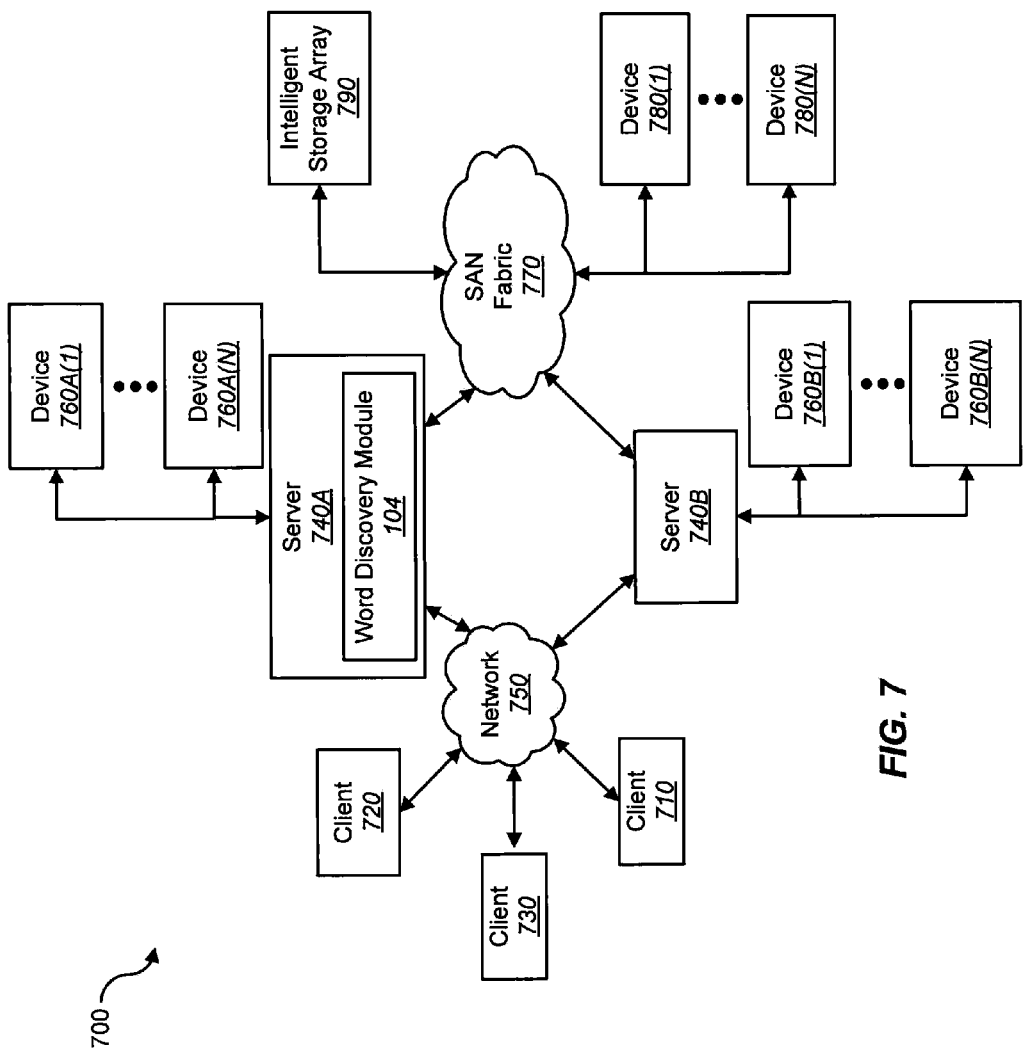
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A, 740B (any of which can be implemented using computer system 710), are coupled to a network 750. In one embodiment, the sequence recognizing module 104 may be located within the storage servers 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 920, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to identify new words from a meta tag, comprising:
storing, by a processor, a plurality of language-specific dictionaries in a database;
identifying, by the processor, a website that uses a non-Latin-based language;
analyzing, by the processor, a Hyper-Text Markup Language (HTML) page of the website to identify a meta tag associated with the HTML page;
identifying, by the processor, non-Latin-based content in the meta tag of the HTML page;
identifying, by the processor, a language of the non-Latin-based content;
selecting, by the processor, a dictionary from the plurality of language-specific dictionaries, based on the identified language of non-Latin-based content;
identifying, by the processor, whether a space exists in the non-Latin-based content,
if a space exists in the non-Latin-based content in the meta tag, dividing the non-Latin-based content into a plurality of portions using the identified space, and
if the space does not exist in the non-Latin-based content, identify at least one punctuation mark included in the non-Latin-based content, and dividing the non-Latin-based content into a plurality of portions using the identified at least one punctuation mark;
filtering the plurality of portions according to a predetermined criteria to obtain filtered portions, wherein each filtered portion comprises a word;
wherein for each filtered portion:
comparing, by the processor, the word to content stored in the selected dictionary to determine whether the word exist in the selected dictionary;
upon determining that the word does not exist in the selected dictionary, adding, by the processor, the word to the selected dictionary, and identifying another filtered portion to compare with the selected dictionary until every filtered portion is compared with the selected database; and
upon determining that the word does exist in the selected dictionary, identifying another filtered portion to compare with the selected dictionary until every filtered portion is compared with the selected database.

2. The method of claim 1, wherein the content in the meta tag comprises at least one word related to the content of the HTML page.

3. The method of claim 1, wherein the identified at least one punctuation mark comprises a comma.

4. The method of claim 1, wherein the identified at least one punctuation mark comprises a semi-colon.

5. The method of claim 1, wherein the identified at least one punctuation mark separates at least one word from another word, the at least one word and the other word being included in the content of the meta tag.

6. A computing device configured to identify new words from a meta tag, comprising:
a processor;
memory in electronic communication with the processor; and
instructions stored in the memory, the instructions being executable by the processor to:
store a plurality of language-specific dictionaries in a database;
identify a website that uses a non-Latin-based language;
analyze a Hyper-Text Markup Language (HTML) page to identify a meta tag associated with the HTML page;
identify non-Latin-based content in the meta tag of the HTML page;
identify a language of the non-Latin-based content;
select a dictionary from the plurality of language-specific dictionaries, based on the identified language of non-Latin-based content;
identify whether a space exists in the non-Latin-based content,
if a space exists in the non-Latin-based content in the meta tag, dividing the non-Latin-based content into a plurality of portions using the identified space, and
if the space does not exist in the non-Latin-based content, identify at least one punctuation mark included in the non-Latin-based content, and dividing the non-Latin-based content into a plurality of portions using the identified at least one punctuation mark;
filter the plurality of portions according to a predetermined criteria to obtain filtered portions, wherein each filtered portion comprises a word;
wherein for each filtered portion:
compare the word to content stored in the selected dictionary to determine whether the word exist in the selected dictionary;
upon determining that the word does not exist in the selected dictionary, add the word to the selected dictionary, and identify another filtered portion to compare with the selected dictionary until every filtered portion is compared with the selected database; and
upon determining that the word does exist in the selected dictionary, identify another filtered portion to compare with the selected dictionary until every filtered portion is compared with the selected database.

7. The computing device of claim 6, wherein the content in the meta tag comprises at least one word related to the content of the HTML page.

8. The computing device of claim 6, wherein the identified at least one punctuation mark comprises a comma.

9. The computing device of claim 6, wherein the identified at least one punctuation mark separates at least one word from another word, the at least one word and the other word being included in the content of the meta tag.

10. A computer-program product for identifying new words from a meta tag, the computer-program product comprising a non-transitory computer-readable medium having instructions thereon, the instructions comprising:
code programmed to store a plurality of language-specific dictionaries in a database;
code programmed to identify a website that uses a non-Latin-based language;
code programmed to analyze a Hyper-Text Markup Language (HTML) page to identify a meta tag associated with the HTML page;
code programmed to identify non-Latin-based content in the meta tag of the HTML page;
code programmed to identify a language of the non-Latin-based content;
code programmed to select a dictionary from the plurality of language-specific dictionaries, based on the identified language of non-Latin-based content;
code programmed to identify whether a space exists in the non-Latin-based content,
if a space exists in the non-Latin-based content in the meta tag, dividing the non-Latin-based content into a plurality of portions using the identified space, and
if the space does not exist in the non-Latin-based content, identify at least one punctuation mark included in the non-Latin-based content, and dividing the non-Latinbased content into a plurality of portions using the identified at least one punctuation mark;

code programmed to filter the plurality of portions according to a predetermined criteria to obtain filtered portions, wherein each filtered portion comprises a word;

wherein for each filtered portion:

code programmed to compare the word to content stored in the selected dictionary to determine whether the word exist in the selected dictionary;

upon determining that the word does not exist in the selected dictionary, code programmed to add the word to the selected dictionary, and identify another filtered portion to compare with the selected dictionary until every filtered portion is compared with the selected database; and upon determining that the word does exist in the selected dictionary, code programmed to identify another filtered portion to compare with the selected dictionary until every filtered portion is compared with the selected database.

* * * * *